United States Patent
Dong et al.

(10) Patent No.: US 9,713,198 B2
(45) Date of Patent: Jul. 18, 2017

(54) MOBILE COMMUNICATION METHOD

(71) Applicant: Spreadtrum Communications (Shanghai) Co., Ltd., Shanghai (CN)

(72) Inventors: Xiaojian Dong, Shanghai (CN); Qiang Cao, Shanghai (CN); Dian Xu, Shanghai (CN); Baikui Xu, Shanghai (CN); Yu Dong, Shanghai (CN); Xuqiang Shen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 23 days.

(21) Appl. No.: 14/452,920

(22) Filed: Aug. 6, 2014

(65) Prior Publication Data
US 2015/0126182 A1 May 7, 2015

(30) Foreign Application Priority Data

Nov. 4, 2013 (CN) .......................... 2013 1 0539747

(51) Int. Cl.
*H04W 88/06* (2009.01)
*H04W 8/22* (2009.01)
*H04W 36/00* (2009.01)

(52) U.S. Cl.
CPC .............. *H04W 88/06* (2013.01); *H04W 8/22* (2013.01); *H04W 36/0022* (2013.01)

(58) Field of Classification Search
CPC ... H04W 36/0022; H04W 88/06; H04W 8/22; H04W 4/10; H04W 76/005; H04W 84/08; H04B 1/0064; H04B 1/406; H04B 1/48
(Continued)

(56) References Cited

U.S. PATENT DOCUMENTS

2002/0142796 A1* 10/2002 Sutton ...................... H04B 1/48
455/553.1
2012/0134279 A1* 5/2012 Tamaki .................. H04B 7/024
370/248
(Continued)

FOREIGN PATENT DOCUMENTS

| CN | 201054728 Y | 4/2008 |
| CN | 102480316 A | 5/2012 |

(Continued)

OTHER PUBLICATIONS

Chinese First Office Action corresponding to Application No. 201310539747.X; Issued: Jul. 19, 2016, with English translation.

*Primary Examiner* — Hirdepal Singh
(74) *Attorney, Agent, or Firm* — Cantor Colburn LLP

(57) ABSTRACT

A mobile communication method based on a mobile communication terminal is provided, wherein a communication unit of the mobile communication terminal is adapted to working in at least two communication modes, and an antenna assembly of the mobile communication terminal is adapted to selectively working in different communication modes or in a combination of different communication modes. The method includes: selecting, based on a communication mode and a service type of the mobile communication terminal, a coupling relationship between the antenna assembly and the communication unit, so that the mobile communication terminal can work in various working modes; and if the communication mode and/or the service type of the mobile communication terminal changes, adjusting the coupling relationship between the antenna assembly and the communication unit based on the change. The mobile communication terminal using the method has characteristics of small size, low cost and less difficulty to design.

12 Claims, 11 Drawing Sheets

(58) Field of Classification Search
USPC .......................................................... 455/426.1
See application file for complete search history.

(56) References Cited

U.S. PATENT DOCUMENTS

| | | | | |
|---|---|---|---|---|
| 2012/0264473 | A1* | 10/2012 | Mujtaba ................ | H04W 68/00 455/515 |
| 2013/0148636 | A1* | 6/2013 | Lum .................... | H04B 1/0064 370/336 |
| 2014/0170990 | A1* | 6/2014 | Black .................... | H04B 1/401 455/73 |
| 2014/0308986 | A1* | 10/2014 | Yang .................... | H04W 88/06 455/552.1 |
| 2015/0017978 | A1* | 1/2015 | Hong .................... | H04W 88/06 455/426.1 |
| 2015/0065066 | A1* | 3/2015 | Kang ..................... | H01Q 9/42 455/78 |
| 2015/0105120 | A1* | 4/2015 | Lim .................. | H04W 36/0022 455/552.1 |
| 2015/0129965 | A1* | 5/2015 | Roy .................. | H01L 29/41758 257/347 |
| 2015/0180514 | A1* | 6/2015 | Pavacic ................ | H04B 1/0064 455/552.1 |

FOREIGN PATENT DOCUMENTS

| | | |
|---|---|---|
| CN | 102647221 A | 8/2012 |
| CN | 103260268 A | 8/2013 |

* cited by examiner

MOBILE COMMUNICATION METHOD

CROSS-REFERENCE TO RELATED APPLICATIONS

The present application claims priority to Chinese patent application No. 201310539747.X, filed on Nov. 4, 2013, and entitled "MOBILE COMMUNICATION METHOD", the entire disclosure of which is incorporated herein by reference.

TECHNICAL FIELD

The present disclosure generally relates to mobile communication technology, and more particularly, to a mobile communication method.

BACKGROUND

With vigorous development of internet applications, the existing 3 Generation (3G) communication network can not meet the growing demand. Wireless communication systems are increasingly taking development trends of mobility, broadband and internet. Under this circumstance, as the 4 Generation (4G) communication technology, 3GPP Long Term Evolution (LTE) becomes the future network evolution direction.

LTE network is based on the full Internet Protocol (IP) architecture, and can only provide Voice over IP service (VoIP) based on Packed-Switched (PS). As LTE network does not possess capabilities of calling and service controlling needed in conversation services, it is therefore required for IP Multimedia Subsystem (IMS) of a core network to provide the control function needed in the conversation service.

Deployment of LTE network and IMS network is a gradual process. At the beginning of constructing a LTE network, to ensure a connection among voice services, an implementation approach provides a mobile communication terminal having dual-standby ability. For example, the mobile communication terminal may standby simultaneously in a LTE network and a 2G/3G network, which is referred to as Simultaneous Voice and LTE (SVLTE).

Inventors of the present disclosure have found through researches that the conventional mobile communication terminal having dual-standby ability has some drawbacks, such as big size, high cost and difficult to design.

The drawbacks mainly result from the fact that, if receiving simultaneously both LTE system signal and 2G/3G system signal, the mobile communication terminal needs at least three antennas, wherein two antennas are dedicated to LTE system, and one antenna is dedicated to 2G/3G system.

In other words, with respect to a mobile communication terminal having single-standby ability, the mobile communication terminal having dual-standby ability requires additional antennas, RF chips, filters, and even baseband chip, and thus resulting in high R&D difficulty and long cycle.

Furthermore, with respect to a mobile communication terminal with single-standby ability, the mobile communication terminal with dual-standby ability may have an increased size of printed circuit board. However, middle and low-end mobile communication terminals on the market generally have a screen size of 4.0" and even smaller, which brings challenges in the design, especially for manufacturers demanding for strict design requirements.

SUMMARY

Embodiments of the present disclosure provide a mobile communication method to reduce the mobile communication terminal size and cost.

In an embodiment, a mobile communication method based on a mobile communication terminal is provided, wherein a communication unit of the mobile communication terminal is adapted to working in at least two communication modes, and an antenna assembly of the mobile communication terminal is adapted to selectively working in different communication modes or in a combination of different communication modes. The method includes: selecting, based on a communication mode and a service type of the mobile communication terminal, a coupling relationship between the antenna assembly and the communication unit, so that the mobile communication terminal can work in various working modes; and if the communication mode and/or the service type of the mobile communication terminal changes, adjusting the coupling relationship between the antenna assembly and the communication unit based on the change.

Because the antenna assembly is adapted to selectively working in different communication modes or in a combination of different communication modes, the antenna assembly can be shared, which thus make the mobile communication terminal using the method have a reduced size and a lowered cost and easy to design.

DETAILED DESCRIPTION

Figure 1:
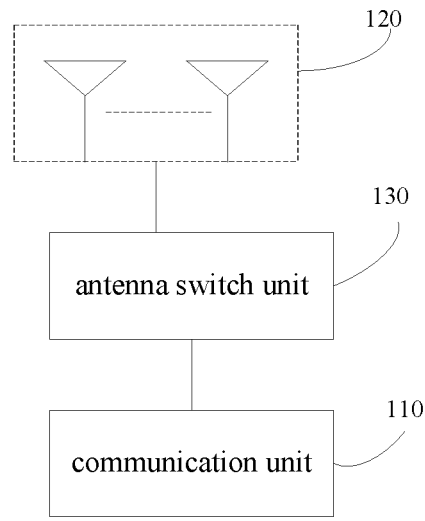
FIG. 1 schematically illustrates a structural diagram of a mobile communication terminal according to an embodiment of the present disclosure.

Referring to FIG. 1, FIG. 1 schematically illustrates a structural diagram of a mobile communication terminal according to an embodiment of the present disclosure.

The mobile communication terminal includes a communication unit 110, an antenna assembly 120 and an antenna switch unit 130 which are coupled to the communication unit 110. The antenna switch unit 130 is configured to switch between coupling modes between the communication unit 110 and the antenna assembly 120.

The communication unit 110 is adapted to working in at least two communication modes. The antenna assembly is adapted to selectively working in different communication modes or in a combination of different communication modes. The antenna switch unit 130 is configured to switch a coupling mode between the communication unit 110 and the antenna assembly 120, to match a communication mode in which the communication unit 110 operates and a service type in the communication mode.

In an embodiment, the communication unit 110 may be configured to work in a first communication mode and/or a second communication mode. In the first communication mode, the communication unit 110 is adapted to processing PS service. In the second communication mode, the communication unit 110 is adapted to processing Circuit-Switched (CS) service, PS service, or CS and PS concurrent services. In a combination of the first and second communication modes, the communication unit 110 is adapted to processing PS service in the first communication mode, while processing CS service in the second communication mode, or be on standby in both the first and second communication modes, or be in a connected state in the first communication mode while on standby in the second communication mode.

The antenna assembly 120 may be coupled to the communication unit 110 in at least three ways.

In an embodiment, according to a first coupling mode, the antenna assembly 120 may match the communication unit 110 working in the second communication mode. According to the first coupling mode, the antenna assembly 120 may match the communication unit 110 working in both the first and second communication modes. As a result, the mobile communication terminal can be on standby in both the first and second communication modes, or process both a service in the first communication mode and a service in the second communication mode.

It should be noted to those skilled in the art that, the expression of working in both the first and second communication modes, or similar expression is not intended to limit the scope of the present disclosure. Other methods may be used to achieve an antenna assembly shared by the first and second communication modes. For example, the antenna assembly may operate both in the first and the second communication modes in a time-division way.

In an embodiment, according to a second coupling mode, the antenna assembly 120 may match the communication unit 110 working in both the first and second communication modes. As a result, the mobile communication terminal can process service in the first communication mode while be on standby in the second communication mode, or be on standby both in the first and the second communication modes.

In an embodiment, according to a third coupling mode, the antenna assembly 120 may match the communication unit 110 working in the first communication mode.

The antenna switch unit 130 may be configured to dynamically switch between the coupling modes between the communication unit 110 and the antenna assembly 120, based on the service type and the communication mode in which the communication unit 110 operates.

In some embodiments, the first communication mode may be a 4G communication mode, such as LTE, including but not limited to FDD-LTE, TDD-LTE, etc. In some embodiments, the second communication mode may be a 2G/3G communication mode, including but not limited to GSM, CDMA, WCDMA, CDMA2000, TD-SCDMA, etc.

As an example, in the current Specification of dual-standby terminal by China Communications Standards Association (CCSA), the first communication mode and the second communication mode may be classified as follows.

For type 1 of TD-LTE/TD-SCDMA/GSM(GPRS) multi-mode dual-link terminal specified by CCSA, the first communication mode refers to TD-LTE, and the second communication mode refers to TD-SCDMA/GSM(GPRS).

For type 2 of TD-LTE/TD-SCDMA/GSM(GPRS) multi-mode dual-link terminal specified by CCSA, the first communication mode refers to TD-LTE/TD-SCDMA, and the second communication mode refers to GSM(GPRS).

For type 1 of TD-LTE/LTE FDD/TD-SCDMA/WCDMA/GSM(GPRS) multimode dual-link terminal specified by CCSA, the first communication mode refers to TD-LTE/LTE FDD, and the second communication mode refers to TD-SCDMA/GSM(GPRS)/WCDMA.

For type 2 of TD-LTE/LTE FDD/TD-SCDMA/WCDMA/GSM(GPRS) multimode dual-link terminal specified by CCSA, the first communication mode refers to TD-LTE/LTE FDD/TD-SCDMA, and the second communication mode refers to GSM(GPRS)/WCDMA.

In some embodiments, the communication unit 110 may be configured to work in a first communication mode and/or a second communication mode. The antenna assembly 120 may be coupled to the communication unit 110 in at least three ways. For example, the antenna assembly 120 may match the communication unit 110 working in the first communication mode according to a first coupling mode; the antenna assembly 120 may match the communication unit 110 working in the second communication mode according to a second coupling mode; or, the antenna assembly 120 may match the communication unit 110 working in both the first and second communication modes according to a third coupling mode. The antenna switch unit 130 may be configured to dynamically switch, based on the communication mode in which the communication unit 110 operates, between the coupling modes between the communication unit 110 and the antenna assembly 120.

In some embodiments, the first communication mode may be a 4G communication mode, such as LTE, including but not limited to FDD-LTE, TDD-LTE, etc. In some embodiments, the second communication mode may be a 2G/3G communication mode, including but not limited to GSM, CDMA, WCDMA, CDMA2000, TD-SCDMA, etc.

Figure 2:
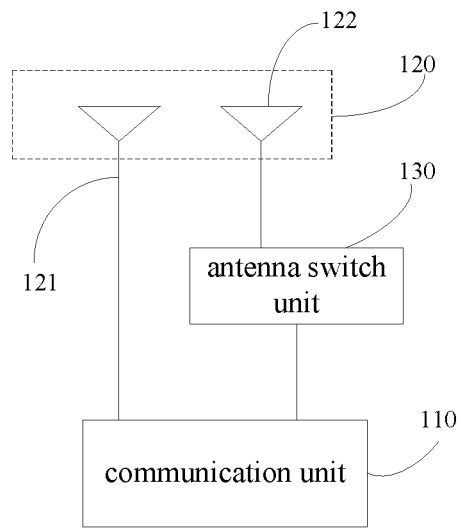
FIG. 2 schematically illustrates a structural diagram of a mobile communication terminal according to an example of the present disclosure.

In some embodiments, referring to FIG. 2, the mobile communication terminal includes a communication unit 110, an antenna assembly 120 and an antenna switch unit 130 which are coupled to the communication unit 110. The antenna switch unit 130 is configured to switch between coupling modes between the communication unit 110 and the antenna assembly 120.

The communication unit 110 is adapted to working in at least two communication modes. The antenna assembly is adapted to selectively working in different communication modes or in a combination of different communication modes. The antenna switch unit 130 is configured to switch between coupling modes between the communication unit 110 and the antenna assembly 120, so that the coupling mode matches a service type and a communication mode in which the communication unit 110 operates.

The antenna assembly 120 includes a first antenna 121 and a second antenna 122.

In some embodiments, the communication unit 110 may be configured to work in a first communication mode and/or a second communication mode.

Specifically, in the first communication mode, the communication unit 110 is adapted to working on PS service. In the second communication mode, the communication unit 110 is adapted to working on CS service, PS service, or CS and PS concurrent services. In a combination of the first and second communication modes, the communication unit 110 is adapted to working on PS service in the first communication mode, while working on CS service in the second communication mode, or be on standby in both the first and second communication modes, or be connected in the first communication mode while on standby in the second communication mode.

The antenna switch unit 130 may switch between coupling relationships between the second antenna 122 and the communication unit 110 according to the communication mode in which the communication unit 110 operates, such that the antenna assembly 120 is able to work in the following work modes: the first antenna 121 and the second antenna 122 work in the first communication mode and the second communication mode, respectively, or the first antenna 121 does not work while the second antenna 122 works in the second communication mode; the first antenna 121 and the second antenna 122 both work in the first communication mode; the first antenna 121 works in the first communication mode, and the second antenna 122 works both in the first and second communication modes; and either the first antenna 121 or the second antenna 122 works separately in the first communication mode.

It should be noted to those skilled in the art that, the expression of the second antenna working in both the first and second communication modes, or similar expression shall not limit the scope of the present disclosure. Other methods may be used to achieve the second antenna shared by the first and second communication modes. For example, the second antenna may work in the first and second communication modes in a time-division way.

The antenna assembly 120 may be coupled to the communication unit 110 in at least three ways.

In an embodiment, according to a first coupling mode, the first antenna 121 does not work, and the second antenna 122 matches the communication unit 110 working in the second communication mode. In the first coupling mode, the first antenna 121 may work in the first communication mode to match the communication unit 110, and the second antenna 122 may match the communication unit 110 to work in the second communication mode, such that the mobile communication terminal can be on standby both in the first and second communication modes, or process service in the first communication mode through the first antenna 121 matching the communication unit 110, or process service in the second communication mode through the second antenna 122 matching the communication unit 110.

In an embodiment, according to a second coupling mode, the first antenna 121 and the second antenna 122 match the communication unit 110 working in the first communication mode, and the second antenna 122 matches the communication unit 110 working in the second communication mode, such that the mobile communication terminal can process service in the first communication mode and be on standby in the second communication mode, or be on standby in both the first and second communication modes.

In an embodiment, according to a third coupling mode, the first antenna 121 and the second antenna 122 collectively match the communication unit 110 working in the first communication mode; or, either the first antenna 121 or the second antenna 122 operates separately in the first communication mode.

The antenna switch unit 130 is configured to dynamically switch between the coupling modes between the communication unit 110 and the antenna assembly 120, based on the service type and the communication mode in which the communication unit 110 operates.

In some embodiments, the first communication mode may be a 4G communication mode, such as LTE, including but not limited to FDD-LTE, TDD-LTE, etc. In some embodiments, the second communication mode may be a 2G/3G communication mode, including but not limited to GSM, CDMA, WCDMA, CDMA2000, TD-SCDMA, etc.

It should be noted that, according to the mobile communication terminal provided in accordance with embodiments as described above, the antenna assembly 120 may match the communication unit 110 to process various mobile communication services, including but not limited to: the first antenna 121 and the second antenna 122 matching the communication unit 110 to process PS service and CS service, respectively; both the first antenna 121 and the second antenna 122 matching the communication unit 110 to work on PS service; the first antenna 121 working on PS service, and the second antenna 122 working on CS service and PS service; and, either the first antenna 121 or the second antenna 122 separately matching the communication unit 110 to process PS service.

It should be noted to those skilled in the art that, processing both CS and PS services may be achieved in a time-division way, which will not be described in detail herein.

It should be noted that, according to the mobile communication terminal provided in accordance with embodiments as described above, the antenna assembly 120 may match the communication unit 110 to process various mobile communication services, including but not limited to: the first antenna 121 and the second antenna 122 matching the communication unit 110 to process data service and voice service, respectively; both the first antenna 121 and the second antenna 122 matching the communication unit 110 to process data service; the first antenna 121 processing data service, and the second antenna 122 processing data and voice services; and, either the first antenna 121 or the second antenna 122 separately matching the communication unit 110 to process data service.

It should be noted to those skilled in the art that, processing both data and circuit services may be achieved in a time-division way.

Figure 3:
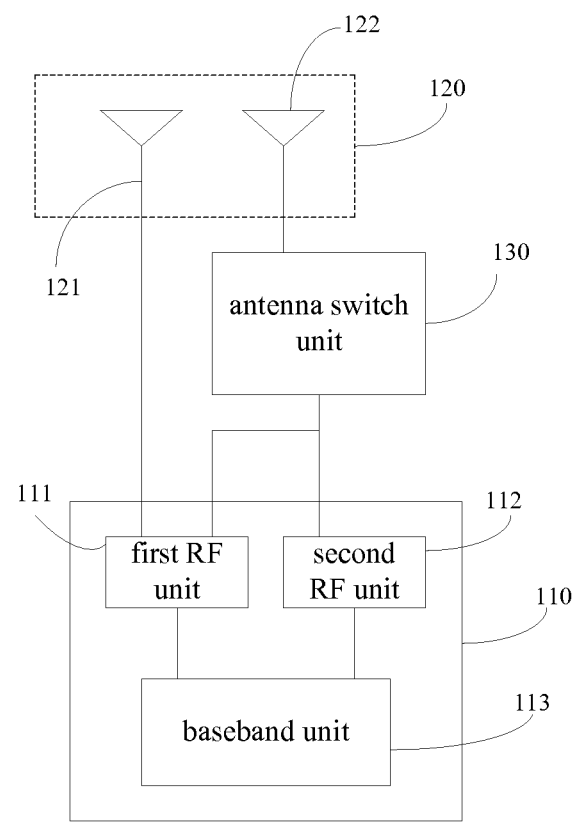
FIG. 3 schematically illustrates a structural diagram of a mobile communication terminal according to an example of the present disclosure.

In some embodiments, referring to FIG. 3, the mobile communication terminal includes a communication unit 110, an antenna assembly 120 and an antenna switch unit 130 which are coupled to the communication unit 110.

The antenna assembly 120 includes a first antenna 121 and a second antenna 122.

The communication unit 110 includes a first Radio Frequency (RF) unit 111, a second RF unit 112 and a baseband unit 113. The first RF unit 111 is configured to process RF signals in the first communication mode. The second RF unit 112 is configured to process RF signals in the second communication mode. The baseband unit 113 is configured to process baseband signals in various communication modes.

The antenna switch unit 130 is configured to switch between coupling modes between the communication unit 110 and the antenna assembly 120. The coupling modes may include, but not limited to: the first antenna 121 and the second antenna 122 being coupled to the first RF unit 111 and the second RF unit 112, respectively; both the first antenna 121 and the second antenna 122 being coupled to the first RF unit 111; the first antenna 121 being coupled to the first RF unit 111, and the second antenna 122 being coupled to both the first RF unit 111 and the second RF unit 112.

The antenna switch unit 130 may switch between coupling modes between the second antenna 122 and the communication unit 110, such that the antenna assembly 120 is able to work in the following work modes: each antenna of the antenna assembly 120 correspondingly working in a communication mode different from each other; all antennas of the antenna assembly 120 working in a same communication mode; one part of antennas of the antenna assembly 120 working in one communication mode, and the other part of antennas of the antenna assembly 120 working in at least two communication modes.

For example, the first antenna 121 and the second antenna 122 work in the first communication mode and the second communication mode, respectively; or, the first antenna 121 does not work, and the second antenna 122 works in the second communication mode; both the first antenna 121 and the second antenna 122 work in the first communication mode; or, the first antenna 121 or the second antenna 122 operate separately in the first communication mode; or, the first antenna 121 works in the first communication mode, and the second antenna 122 works in both the first and second communication modes.

It should be noted to those skilled in the art that, the first RF unit 111 and the second RF unit 112 may be implemented using a discrete device, or be integrated together, or be implemented using a single chip having the ability of processing multi-mode RF signals.

Figure 4:
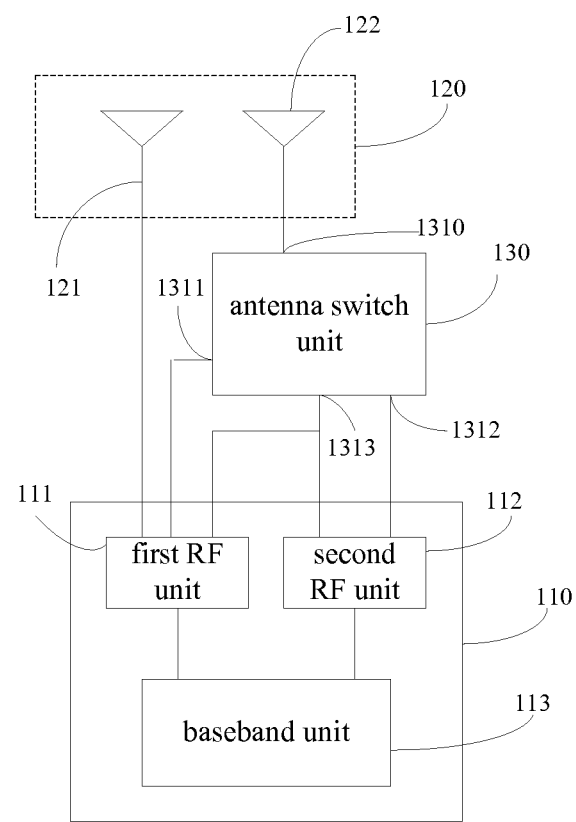
FIG. 4 schematically illustrates a structural diagram of a mobile communication terminal according to an example of the present disclosure.

In some embodiments, referring to FIG. 4, the antenna switch unit 130 includes an antenna port 1310 and three communication ports including a first communication port 1311, a second communication port 1312 and a third communication port 1313.

The antenna port 1310 is connected with the second antenna, the first communication port 1311 is connected with the first RF unit 111, the second communication port 1312 is connected with the second RF unit 112, and the third communication port 1313 is connected with both the first RF unit 111 and the second RF unit 112.

It should be noted that the number of the communication ports is determined depending on the communication mode which the terminal supports. For example, for FDD-LTE, the number of the communication ports may be 1; for TDD-LTE, the number of the communication ports may be 2; and, for GSM, the number of the communication ports may be 2.

Figure 5:
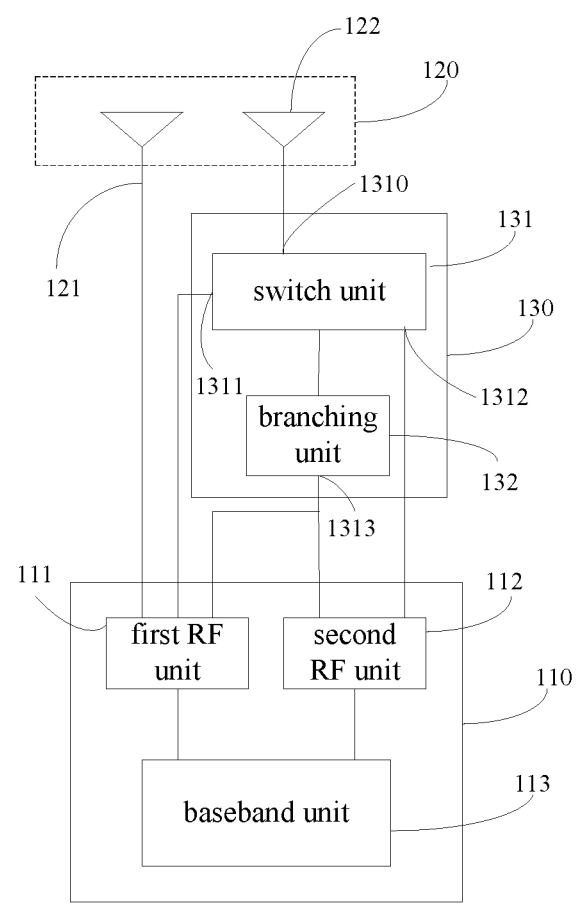
FIG. 5 schematically illustrates a structural diagram of a mobile communication terminal according to an example of the present disclosure.

In some embodiments, referring to FIG. 5, the antenna switch unit 130 includes a switch unit 131 and a branching unit 132, which are coupled together. The switch unit 131 is further coupled to the second antenna 122, the first RF unit 111 and the second RF unit 112. The branching unit 132 is further coupled to the first RF unit 111 and the second RF unit 112.

In some embodiments, the switch unit 131 may adopt a single-pole multi-throw switch or the like, and the branching unit 132 may adopt a power splitter or the like, which are not described in detail herein.

Figure 6:
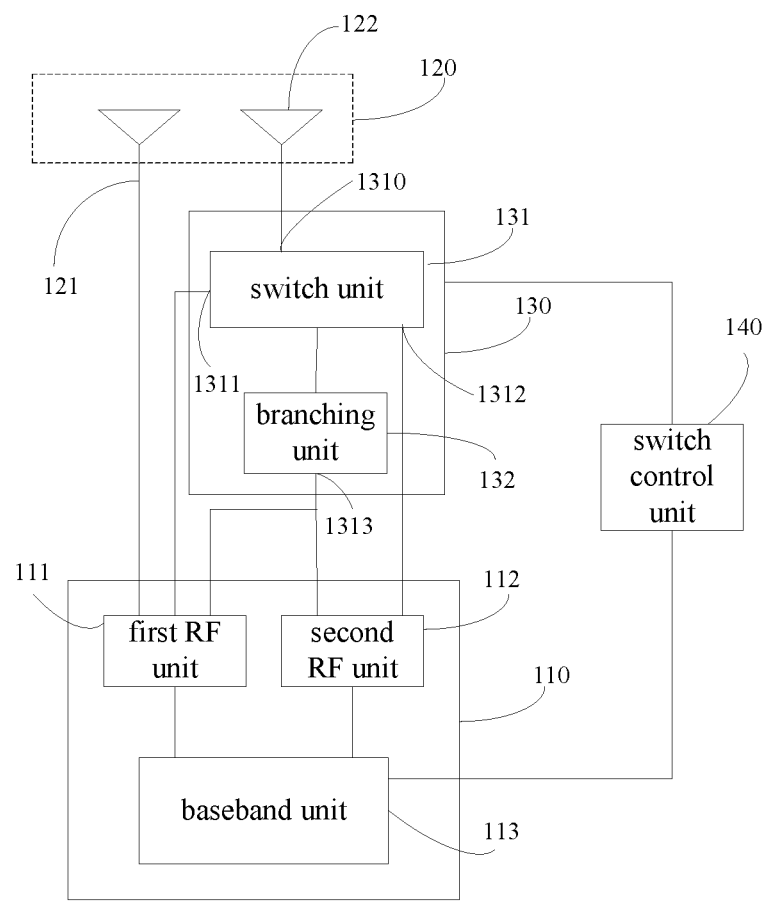
FIG. 6 schematically illustrates a structural diagram of a mobile communication terminal according to an example of the present disclosure.

In some embodiments, referring to FIG. 6, the mobile communication terminal further includes a switch control unit 140 which is configured to send a switch control signal to the antenna switch unit 130.

The switch control unit 140 generates the switch control signal based on information from the baseband unit 113. Specifically, information about the coupling modes between the antenna assembly 120 and the communication unit 110, and the communication modes and the service types corresponding to the coupling modes may be stored. Based on the stored information, the switch control signal may be generated by means of a look-up table or a state machine. Alternatively, the switch control unit 140 may receive from the baseband unit 113 a hardware signal and process it. Then the processed hardware signal may be output to trigger the antenna switch unit 130.

In some embodiments, the switch control unit 140 may be configured inside or outside the baseband unit 113.

It should be noted to those skilled in the art that, the baseband unit 113 includes a first processing unit (not shown) for processing a basedband signal in the first communication mode, and a second processing unit (not shown) for processing a basedband signal in the second communication mode. The first processing unit and the second processing unit may be discrete or integrated.

In some embodiments, if the switch control unit 140 is configured inside the baseband unit 113, the switch control unit 140 may be configured in the first processing unit or in the second processing unit. There is a connection path between the first processing unit and the second processing unit to communicate information. The switch control unit 140 processes information from the first processing unit and the second processing unit to generate a switch control signal.

Figure 7:
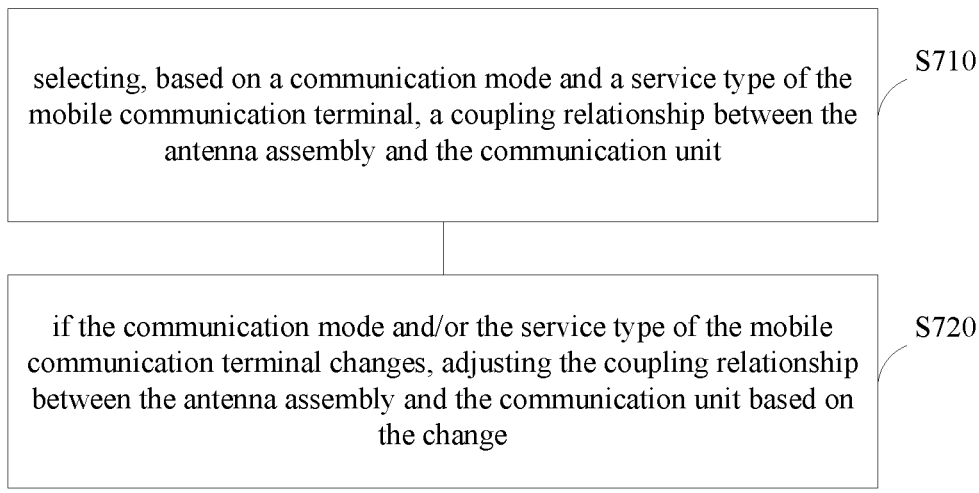
FIG. 7 schematically illustrates a flow chart of a mobile communication method according to an embodiment of the present disclosure.

Referring to FIG. 7, a mobile communication method based on a mobile communication terminal is provided. The mobile communication terminal includes a communication unit and an antenna assembly. The communication unit supports at least two communication modes. The antenna assembly is adapted to selectively work in different communication modes or in a combination of different communication modes.

The mobile communication method includes:
S710, selecting, based on a communication mode and a service type of the mobile communication terminal, a coupling relationship between the antenna assembly and the communication unit, so that the mobile communication terminal can work in various working modes; and
S720, if the communication mode and/or the service type of the mobile communication terminal changes, adjusting the coupling relationship between the antenna assembly and the communication unit based on the change.

The working modes includes, but not limited to, the mobile communication terminal supporting a dual-standby mode (e.g., SVLTE mode) and/or a Circuit Switch FallBack (CSFB) mode.

The coupling relationship between the antenna assembly and the communication unit may include, but not limited to:

each antenna of the antenna assembly working in a communication mode different from each other; each antenna of the antenna assembly working in a same communication mode; one part of antennas of the antenna assembly working in one communication mode, and the other part of antennas of the antenna assembly working in at least two communication modes.

In some embodiments, adjusting the coupling relationship between the antenna assembly and the communication unit may include, but not limited to: adjusting a communication mode in which a part of antennas of the antenna assembly operate.

In some embodiments, the adjusting process may be performed by means of a look-up table or a state machine.

In some embodiments, when adjusting the coupling relationship between the antenna assembly and the communication unit, it might require to adjust a data transmission mode between the mobile communication terminal and the network to ensure smooth service operation, based on actual conditions and requirements in the current communication mode or the combination of different communication modes.

In some embodiments, adjusting a data transmission mode between the mobile communication terminal and the network may include: configuring the mobile communication terminal itself; and exchanging air-interface signaling between the mobile communication terminal and the network.

According to the mobile communication method provided in embodiments as described above, the following can be achieved: different antennas in the antenna assembly respectively matching the communication unit working correspondingly on PS service and CS service; all the antennas in the antenna assembly matching the communication unit working on PS service; one part of antennas in the antenna assembly working on PS service, and the other part of antennas in the antenna assembly working on PS service and CS service; and, a part of antennas in the antenna assembly separately matching the communication unit working on PS service.

According to the mobile communication method provided in embodiments as described above, the following can be achieved: different antennas in the antenna assembly respectively matching the communication unit working correspondingly on data service and voice service; all the antennas in the antenna assembly matching the communication unit working on data service; one part of antennas in the antenna assembly working on data service, and the other part of antennas in the antenna assembly working on both data service and voice service; and, a part of antennas of the antenna assembly separately matching the communication unit working on data service.

Hereinafter an example is provided to describe coupling relationship adjustment, where a mobile communication terminal supports a first communication mode and a second communication mode, and an antenna assembly includes a first antenna and a second antenna.

The working modes of the antenna assembly may include, but not limited to: the first antenna and the second antenna operating respectively in the first communication mode and the second communication mode; or the first antenna not working while the second antenna working in the second communication mode; both the first antenna and the second antenna working in the first communication mode; the first antenna working in the first communication mode, while the second antenna working in both the first and second communication modes; the first antenna or the second antenna separately working in the first communication mode.

When the working mode of the mobile communication terminal is CSFB mode, the coupling relationship between the second antenna and the communication unit is switched according to the current communication mode of the mobile communication terminal.

Specifically, if the current communication mode is the first communication mode, the second antenna is configured exclusively to the first communication mode. In this case, the second antenna may be a diversity reception antenna in the first communication mode. If the current communication mode is the second communication mode, the second antenna is configured exclusively to the second communication mode.

The dynamically adjusting process mentioned above may include: when the mobile communication terminal works in the first communication mode, and if a CSFB service takes place, switching the coupling relationship between the second antenna and the communication unit, so that the second antenna transitions from the first communication mode to the second communication mode; and when the mobile communication terminal returns to the first communication mode after the service in the second communication mode is finished, switching the coupling relationship between the second antenna and the communication unit, so that the second antenna transitions from the second communication mode to the first communication mode to act as the diversity reception antenna in the first communication mode.

When the working mode of the mobile communication terminal is dual-standby mode, e.g., SVLTE mode, the coupling relationship between the second antenna and the communication unit is switched according to the current communication mode and service type of the mobile communication terminal.

Specifically, if the first communication mode and the second communication mode are in idle state, the first antenna works in the first communication mode and the second antenna works in the second communication mode; if the first communication mode is in connected state and the second communication mode is in idle state, the first antenna works in the first communication mode and the second antenna works in both the first and second communication modes; if the first communication mode and the second communication mode are in connected state, the first antenna works in the first communication mode and the second antenna works in the second communication mode; and if the first communication mode is in idle state and the second communication mode is in connected state, the first antenna works in the first communication mode and the second antenna works in the second communication mode.

The dynamically adjusting process may include: if both the first communication mode and the second communication mode are in idle state, when the first communication mode enters into a connected state, switching the second antenna from working in the second communication mode to working in both the first and second communication modes;
    if the first communication mode is in connected state and the second communication mode is in idle state, and when a service is initiated in the second communication mode, switching the second antenna from working in both the first and second communication modes to the second communication mode;
    if both the first communication mode and the second communication mode are in connected state, when a service in the second communication mode is finished, switching the second antenna from the second communication mode to working in both the first and second communication modes;

when the service in the second communication mode is finished, and if the current first communication mode is in connected state, switching the second antenna from working in the second communication mode to working in both the first and second communication modes; and if the first communication mode is in connected state and the second communication mode is in idle state, when a service in the first communication mode is finished, switching the second antenna from working in both the first and second communication modes to the second communication mode.

In some embodiments, switching the coupling relationship between the second antenna and the communication unit may further include: adjusting, based on actual requirements, a data transmission mode in the first communication mode between the communication unit and the network, so as to ensure that the mobile communication terminal can process a service which is received with a single antenna in the first communication mode.

In some embodiments, adjusting a data transmission mode between the mobile communication terminal and the network may include: configuring the mobile communication terminal itself, and exchanging air-interface signaling between the mobile communication terminal and the network.

In some embodiments, the first communication mode may be a 4G communication mode, such as LTE, including but not limited to FDD-LTE, TDD-LTE, etc. In some embodiments, the second communication mode may be a 2G/3G communication mode, including but not limited to GSM, CDMA, WCDMA, CDMA2000, TD-SCDMA, etc.

Referring to FIG. 6, taking LTE as the first communication mode for example, 2G/3G as the second communication mode for example, and the antenna assembly including a first antenna and a second antenna for example, the mobile communication method is described in detail hereunder.

Figure 8:
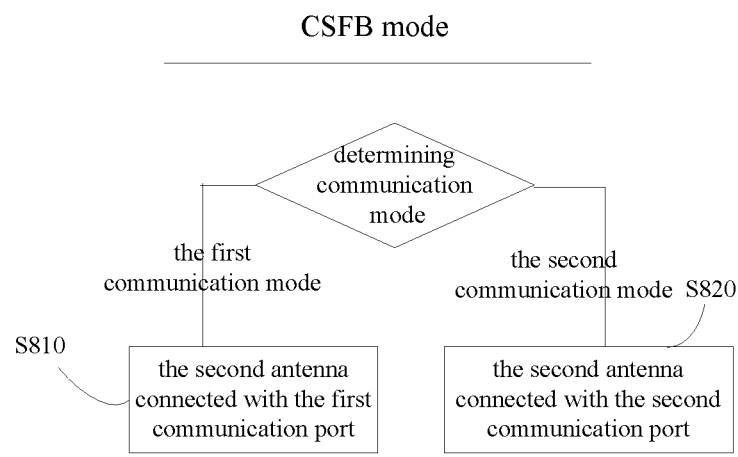
FIG. 8 schematically illustrates a flow chart of a mobile communication method according to an example of the present disclosure.

Referring to FIG. 6 and FIG. 8, when the working mode of the mobile communication terminal is CSFB mode, the coupling relationship between the second antenna 122 and the communication unit 110 is switched according to the current communication mode of the mobile communication terminal.

Specifically, in S810, if the mobile communication terminal works in the first communication mode (namely, LTE), the second antenna 122 is configured to be connected with the first communication port 1311. That is, the second antenna is allocated exclusively to the first communication mode. In this case, the second antenna 122 may work as a diversity reception antenna in the first communication mode.

In S820, if the mobile communication terminal works in the second communication mode (namely, 2G/3G), the second antenna 122 is configured to be connected with the second communication port 1312. That is, the second antenna is allocated exclusively to the second communication mode.

Figure 9:
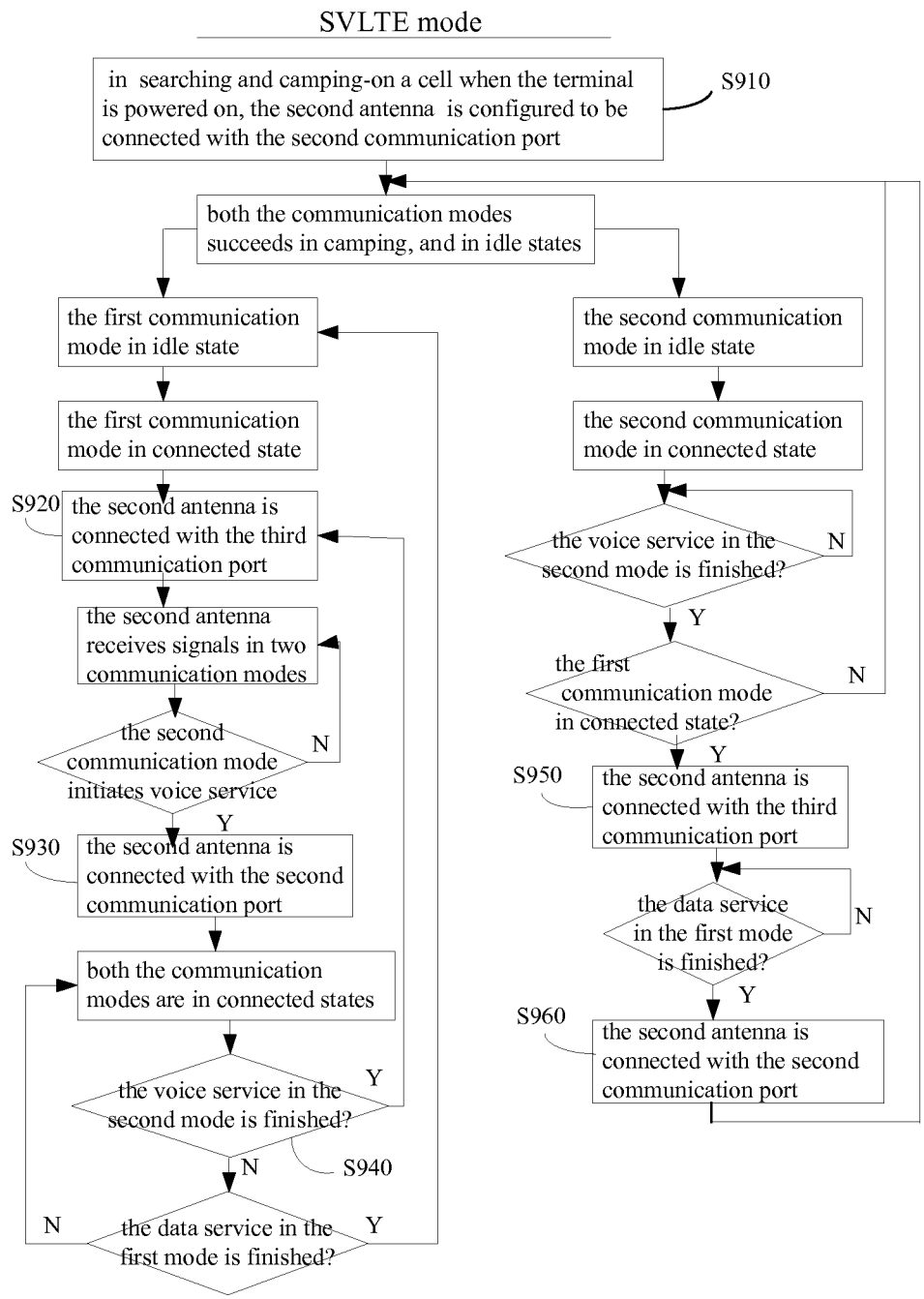
FIG. 9 schematically illustrates a flow chart of a mobile communication method according to an example of the present disclosure.

Referring to FIG. 6 and FIG. 9, when the working mode of the mobile communication terminal is dual-standby mode (e.g., SVLTE mode), it is default that the second antenna 122 is connected with the second communication port 1312.

In the operation of the mobile communication terminal, the coupling relationship between the second antenna 122 and the communication unit 110 is switched according to the current communication mode and service type of the mobile communication terminal.

Specifically, in S910, during searching and camping-on stage when the terminal is powered on, the second antenna 122 is configured to be connected with the second communication port 1312. Under this condition, the first communication mode (LTE) and the second communication mode (2G/3G) are in standby state.

In S920, when the first and second communication modes both are in standby state, when the first communication mode enters into a connected state, the second antenna 122 is configured to be connected with the third communication port 1313. In this situation, the second antenna 122 receives signals both in the first communication mode and in the second communication mode.

In S930, when first communication mode is in connected state, and when a voice service (originating call or terminating call) is initiated in the second communication mode, the second antenna 122 is configured to be connected with the second communication port 1312. In this situation, the first communication mode and the second communication mode are in connected state.

In S940, when the first and second communication modes are in connected state, and when the voice service is finished in the second communication mode, the second antenna 122 is configured to be connected with the third communication port 1313. In this situation, the first communication mode is in connected state, and the second communication mode is in standby state.

S950, when a voice service is finished in the second communication mode, and if the current first communication mode is in connected state, the second antenna 122 is configured to be connected with the third communication port 1313. In this situation, the first communication mode is in connected state, and the second communication mode is in standby state.

In S960, if the second communication mode is in standby state and the first communication mode is in connected state, and when a data service is finished in the first communication mode, the second antenna 122 is configured to be connected with the second communication port 1312. In this situation, the first communication mode and the second communication mode are in standby state.

According to embodiments described above, two antennas are used. When LTE and 2G/3G communication modes are both in idle state, LTE and 2G/3G communication modes respectively use one antenna to measure network without interference. When LTE is in PS connected state and 2G/3G is in idle state, a main antenna (the first antenna) is used exclusively to LTE, and a diversity antenna is shared by LTE communication mode and 2G/3G through a reception divider. When LTE is in PS connected state and 2G/3G initiates a CS service, LTE communication only uses the main antenna for receiving and sending, and the diversity antenna is switched to 2G/3 G for receiving and sending.

In the application shown in FIG. 9, it is found that the coupling relationship adjustment in S930 between the antenna assembly and the communication unit may adversely affect signal transmission quality.

Specifically, LTE needs to use two antennas when it is in PS connected state. However, when the mobile communication terminal initiates a 2G/3G service, the diversity reception antenna used by LTE needs to be totally switched to 2G/3G. Therefore, LTE reception changes from two antenna to one antenna, which thus affects communication quality as below.

With regard to a control channel like Physical Dowlink Contol CHannel (PDCCH), Physical Control Format Indicator CHannel (PCFICH) and so on, when a CS service is initiated in 2G/3G mode, physical layers of the mobile communication terminal may adjust reception of the control channel according to an instruction. Because the control channel adopts transmit diversity, when the number of the reception antenna changes from 2 into 1, the antenna reception scheme may change correspondingly from 4TX/2RX, 2TX/2RX or 1TX/2RX to 4TX/1RX, 2TX/1RX or 1TX/1RX. In this situation, just reception diversity gain is lost. Signal Noise Ratio (SNR) is decreased by about 3 dB according to multipath environment. However, the decreased SNR would not so much affect the reception of the control channel, as reception performance of the control signal has great redundancy.

For Physical Downlink Shared CHannel (PDSCH) Multiple-Input Multiple-Output (MIMO) transmission, when the number of the reception antenna turns from 2 to 1, two Transport Block (TB) data of the PDSCH channel may interference mutually, which causes a great deal of error codes. For other transmission mode of PDSCH, there is no reception diversity gain when the number of the reception antenna turns from 2 to 1. SNR is decreased by about 3 dB according to multipath environment. LTE base station maintains a code modulation method used on the original PDSCH channel to send data to the terminal. Accordingly, error codes would arise in PDSCH channel.

In light of the transmission quality mentioned above, a new method is proposed by the inventors through inventive researches. When LTE communication mode is in PS connected state, if the mobile communication terminal initiates a CS originating service in 2G/3G mode, or responds to a CS terminating service, or updates a CS domain location, the transmission mode of the PDSCH channel in LTE network may be adjusted, through a certain processing, from reception diversity or MIMO to be fit for a single antenna. Afterwards, the mobile communication terminal stops using the reception diversity antenna in LTE communication mode, to totally switch the reception diversity antenna to 2G/3G communication mode as transceiver antenna.

Hereunder, embodiments of the present disclosure will be described in detail to illustrate above method.

Figure 10:
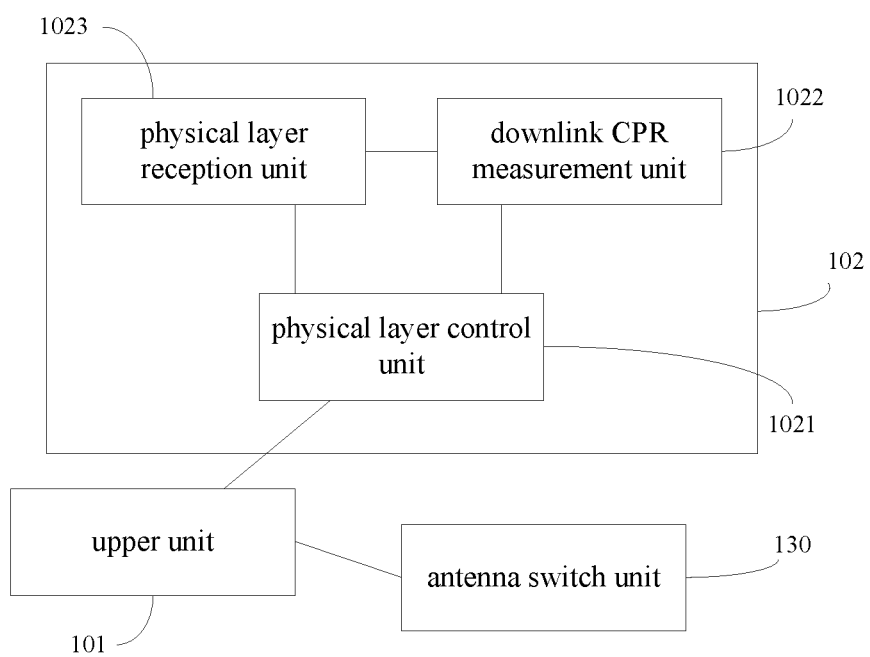
FIG. 10 schematically illustrates a structural diagram of a mobile communication terminal according to an example of the present disclosure.

FIG. 10 schematically illustrates a structural diagram of a mobile communication terminal according to an example of the present disclosure.

Referring to FIG. 10, the mobile communication terminal includes: an upper unit 101, a LTE physical layer unit 102 and an antenna switch unit 130. The LTE physical layer unit 102 includes a physical layer control unit 1021, a downlink CPR (CQI/PMI/RI, Channel Quality Indicator/Precoding Matrix Indicator/Rank Indicator) measurement unit 1022 and a physical layer reception unit 1023.

The physical layer control unit 1021 is configured to modify antenna measurement configuration of the downlink CPR measurement unit 1022, upon receiving an instruction of switching antenna from the upper unit 101; and control the physical layer reception unit 1023 to update reception configuration upon receiving information of updated configuration from a network.

The downlink CPR measurement unit 1022 is configured to measure CPR under the antenna measurement configuration, and generate a measurement result to report to the network.

The physical layer reception unit 1023 is configured to receive signals from the network according to the updated reception configuration.

The upper unit 101 is configured to control the antenna switch unit 130 to perform a switch of antenna connection mode after the physical layer reception unit 1023 updates the reception configuration.

Figure 11:
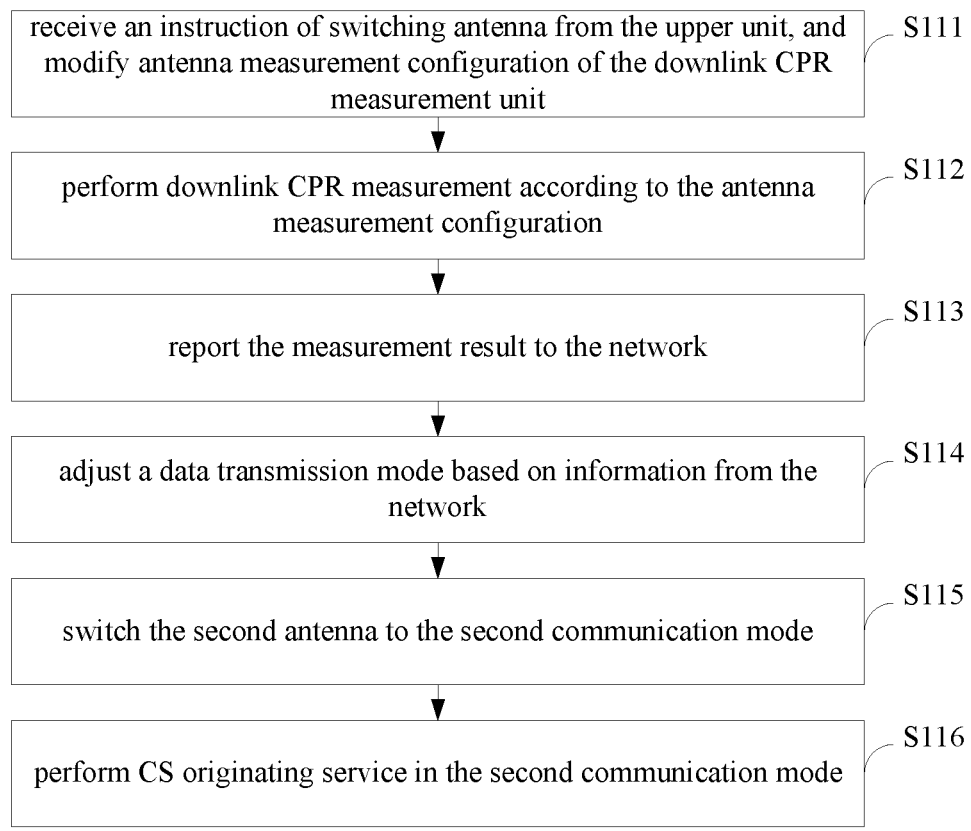
FIG. 11 schematically illustrates a flow chart of a mobile communication method according to an example of the present disclosure.

Referring to FIG. 11, a process of a 2G/3G CS originating service, initiated by a mobile communication terminal which is in LTE PS connected state, includes S111 to S116.

S111, the upper unit of the mobile communication terminal sends an instruction of switching antenna to the physical layer control unit, and the physical layer control unit modifies antenna measurement configuration of the downlink CPR measurement unit from 4TX/2RX, 2TX/2RX or 1TX/2RX to 4TX/1RX, 2TX/1RX or 1TX/1RX;

S112, the downlink CPR measurement unit only receives pilot signals via the first antenna (namely, main antenna) for CPR measurement. The downlink CPR measurement unit sets RI as 1 and performs PMI and CQI measurement in broadband and subband when the antenna measurement configuration is 4TX/1RX, 2TX/1RX or 1TX/1RX, and the RI is 1.

S113, if CPR is reported periodically, the CPR measurement result may be reported to the network side (base station) through the PUCCH channel; and, if CPR is not reported periodically, the CPR measurement result is packaged with a service channel and then reported through the PUSCH channel to the base station after getting DCI instructions on the PDCCH channel from the network side.

In some embodiments, for non-periodical report, the base station instructs via downlink PDCCH DCI the mobile communication terminal to report PMI/CQI/RI. The timing of report is determined by the base station. According to 3GPP measurement case, the mobile communication terminal reports the CPR measurement results to the base station every 1 ms. The dispatch delay of the base station is about 10 ms For periodical report, the base station appoints a reporting cycle with the mobile communication terminal in advance. The mobile communication terminal reports PMI/CQI/RI at the time point of the reporting cycle. In broadband report, the reporting cycle of CQI/PMI is typically 8 Frame (equal to 80 ms), and the reporting cycle of RI is typically 4×8 Frame (equal to 320 ms). In special situations, the reporting cycle of CQI/PMI may be 16 Frame (equal to 160 ms), and the reporting cycle of RI may be 32×16 Frame (equal to 5.12 s). Accordingly, the mobile communication terminal may generally receive an updated PDSCH configuration within one second from the base station, or within 5 to 6 seconds in special situations.

S114, the physical layer reception unit maintains the original antenna configuration and the reception mode of the physical layer control channel PCFICH/PDCCH, PBCH and PHICH, and a traffic channel PDSCH until the base station dispatches, according to the CPR measurement results reported based on the step of S113 in which only the first antenna (main antenna) is used, a PDSCH transmission mode suitable for the single-antenna reception.

Specifically, the LTE physical layer unit may obtain the updated PDSCH configuration information from the base station by decoding DCI on the PDCCH channel. The updated PDSCH configuration information is processed by the physical layer control unit and is then used to update the configuration of the physical layer reception unit. The configuration of the physical layer reception unit matches with the wireless transmission environment of the mobile communication terminal in which only one reception antenna is used in LTE communication mode.

S115, the upper unit of the mobile communication terminal terminates the reception of the diversity reception antenna in the first communication mode, and switches the antenna to work in 2G/3 G communication mode.

S116, the mobile communication terminal initiates CS service in 2G/3G mode.

It should be noted that the duration for establishing originating call would increase with some delay, such as waiting for CPR reporting in S113 and waiting the base station for the dispatch in LTE mode. Generally, the duration may increase by one second, which is acceptable for uses.

Figure 12:
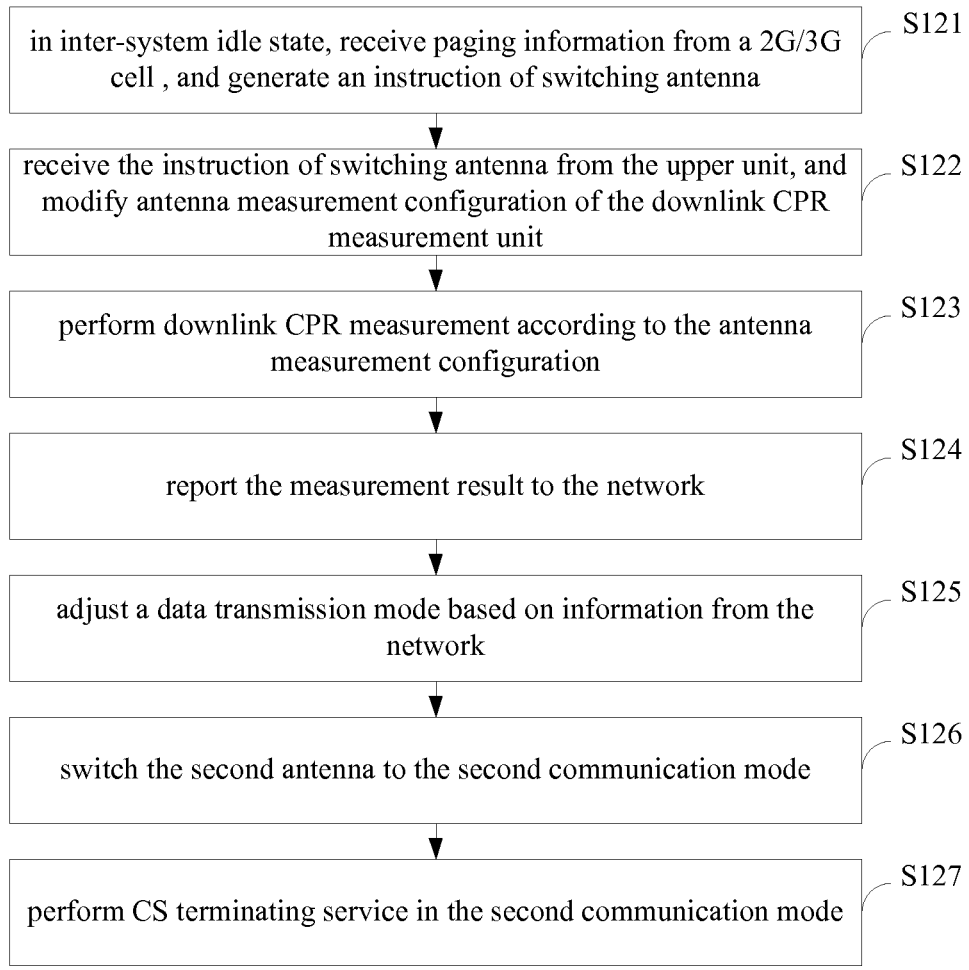
FIG. 12 schematically illustrates a flow chart of a mobile communication method according to an example of the present disclosure.

Referring to FIG. 12, a process of initiating a 2G/3G CS terminating service by a mobile communication terminal in LTE PS connected state includes S121 to S127.

S121, after the mobile communication terminal which is in 2G/3G idle state receives paging information from a 2G/3G cell, the upper unit of the mobile communication terminal sends an instruction of switching antenna to the physical layer control unit.

S122 to S126, which is similar to the steps of S111 to S115 shown in FIG. 11, is not described in detail herein.

S127, the mobile communication terminal responds to the CS terminating service in the 2G/3G cell.

Figure 13:
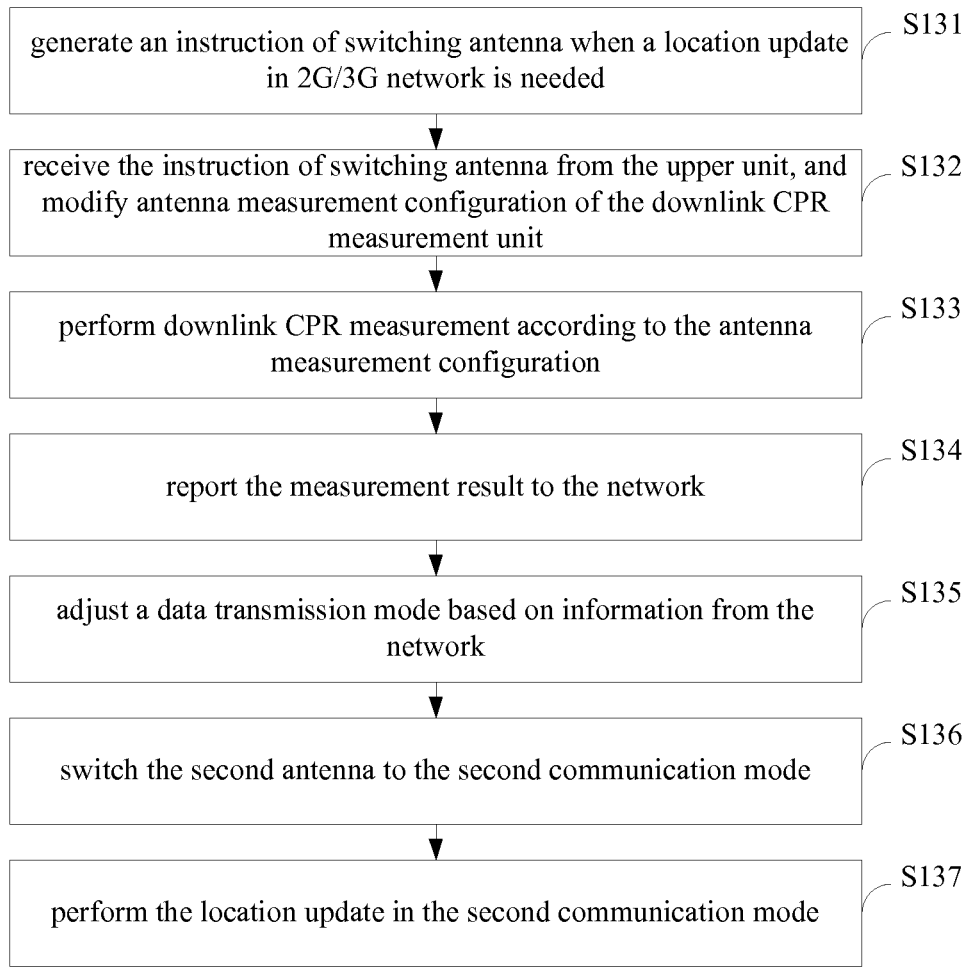
FIG. 13 schematically illustrates a flow chart of a mobile communication method according to an example of the present disclosure.

Referring to FIG. 13, a process of 2G/3G CS location update by a mobile communication terminal which is in LTE PS connected state includes S131 to S137.

S131, if a location update is needed, the upper unit sends an instruction of switching antenna to the physical layer control unit.

Situations where the mobile communication terminal needs location update includes but not limited to, periodical location update, or the mobile communication terminal being in an edge location of a 2G/3G network through measurement in 2G/3G idle state.

S132 to S136, which is similar to the steps of S111 to S115 shown in FIG. 11, is not described in detail herein.

S137, the mobile communication terminal initiates the location update service in the 2G/3G cell.

It will be apparent to those skilled in the art that some or all of the procedures of such methods provided in embodiments of the present disclosure may be performed by related hardware in response to some computer programs. The computer programs may be stored in a computer-readable storage medium, which may execute the processes of the methods described in the above embodiments. The storage medium may be an optical disk, a magnetic disk, a Read-Only Memory (ROM), or a Random Access Memory (RAM), etc.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A mobile communication method based on a mobile communication terminal, wherein a communication unit of the mobile communication terminal is adapted to working in at least two communication modes, and an antenna assembly of the mobile communication terminal is adapted to selectively working in different communication modes or in a combination of different communication modes, the method comprising:
   selecting, based on a communication mode and a service type of the mobile communication terminal, a coupling relationship between the antenna assembly and the communication unit, so that the mobile communication terminal is able to work in various working modes; and
   when the communication mode and/or the service type of the mobile communication terminal changes, adjusting the coupling relationship between the antenna assembly and the communication unit based on the change,
   wherein adjusting the coupling relationship between the antenna assembly and the communication unit comprises: adjusting a data transmission mode between the communication unit and the network so as to guarantee service quality,
   wherein adjusting the data transmission mode between the communication unit and the network comprises: configuring the mobile communication terminal; and exchanging air-interface signaling between the mobile communication terminal and the network, and
   wherein adjusting the data transmission mode between the communication unit and the network further comprises: updating antenna measurement configuration at the terminal side; performing a downlink CPR (CQI/PMI/RI) measurement based on the antenna measurement configuration; reporting the downlink CPR measurement to the network side; and receiving an updated configuration of the transmission mode from the network side, and updating the transmission mode of the terminal side.

2. The mobile communication method according to claim 1, wherein adjusting the coupling relationship between the antenna assembly and the communication unit is achieved through a switch unit, or through a switch unit and a branching unit.

3. The mobile communication method according to claim 2, wherein a control signal for the adjusting process is generated by means of a look-up table or a state machine.

4. The mobile communication method according to claim 1, wherein the working modes comprises the mobile communication terminal supporting a dual-standby mode and/or a CSFB mode.

5. The mobile communication method according to claim 1, wherein the first communication mode is LTE mode, and the second communication mode is 2G/3G mode.

6. The mobile communication method according to claim 1, wherein the antenna assembly comprises a first antenna and a second antenna, and the mobile communication terminal can work in various working modes comprises:
   the mobile communication terminal working in the first communication mode through the first antenna matching with the communication unit, and working in the second communication mode through the second antenna matching with the communication unit;
   the mobile communication terminal working in the first communication mode through the first antenna and the second antenna matching collectively with the communication unit;
   the mobile communication terminal working in the first communication mode through the first antenna and the second antenna matching collectively with the communication unit, and working in the second communication mode through the second antenna matching with the communication unit;
   the mobile communication terminal working in the first communication mode through the first antenna matching with the communication unit; and
   the mobile communication terminal working in the second communication mode through the second antenna matching with the communication unit.

7. The mobile communication method according to claim 1, wherein adjusting the coupling relationship between the antenna assembly and the communication unit comprises adjusting the communication mode in which a part of antennas in the antenna assembly operates.

8. A mobile communication method based on a mobile communication terminal, wherein a communication unit of the mobile communication terminal is adapted to working in at least two communication modes, and an antenna assembly of the mobile communication terminal is adapted to selectively working in different communication modes or in a combination of different communication modes, the method comprising:
  selecting, based on a communication mode and a service type of the mobile communication terminal, a coupling relationship between the antenna assembly and the communication unit, so that the mobile communication terminal is able to work in various working modes; and
  when the communication mode and/or the service type of the mobile communication terminal changes, adjusting the coupling relationship between the antenna assembly and the communication unit based on the change, wherein adjusting the coupling relationship between the antenna assembly and the communication unit comprises adjusting a communication mode in which a part of antennas in the antenna assembly operates,
  wherein the working mode comprises the mobile communication terminal supporting a dual-standby mode and/or a CSFB (circuit switch fallback) mode,
  wherein when the antenna assembly is composed of a first antenna and a second antenna, and when the working mode of the mobile communication terminal is the CSFB mode, the coupling relationship between the second antenna and the communication unit is determined according to the current communication mode of the mobile communication terminal,
  wherein selecting the coupling relationship between the antenna assembly and the communication unit comprises:
  when the mobile communication terminal works in a first communication mode, configuring the second antenna exclusively to the first communication mode; and
  when the mobile communication terminal works in a second communication mode, configuring the second antenna exclusively to the second communication mode.

9. The mobile communication method according to claim 8, wherein adjusting the coupling relationship between the antenna assembly and the communication unit comprises:
  when the mobile communication terminal works in the first communication mode, and if a CSFB service takes place, switching the coupling relationship between the second antenna and the communication unit, so that the second antenna transitions from the first communication mode to the second communication mode; and
  when the mobile communication terminal returns to the first communication mode after the service in the second communication mode is finished, switching the coupling relationship between the second antenna and the communication unit, so that the second antenna transitions from the second communication mode to the first communication mode to act as the diversity reception antenna in the first communication mode.

10. A mobile communication method based on a mobile communication terminal, wherein a communication unit of the mobile communication terminal is adapted to working in at least two communication modes, and an antenna assembly of the mobile communication terminal is adapted to selectively working in different communication modes or in a combination of different communication modes, the method comprising:
  selecting, based on a communication mode and a service type of the mobile communication terminal, a coupling relationship between the antenna assembly and the communication unit, so that the mobile communication terminal is able to work in various working modes; and
  when the communication mode and/or the service type of the mobile communication terminal changes, adjusting the coupling relationship between the antenna assembly and the communication unit based on the change, wherein adjusting the coupling relationship between the antenna assembly and the communication unit comprises adjusting a communication mode in which a part of antennas in the antenna assembly operates,
  wherein when the antenna assembly is composed of a first antenna and a second antenna, and the working mode of the mobile communication terminal is a dual-standby mode, the method further comprises determining the coupling relationship between the second antenna and the communication unit according to the current communication mode and service type of the mobile communication terminal,
  wherein selecting the coupling relationship between the antenna assembly and the communication unit comprises:
  when the first communication mode and the second communication mode are in idle state, the first antenna working in the first communication mode and the second antenna working in the second communication mode;
  when the first communication mode is in connected state and the second communication mode is in idle state, the first antenna working in the first communication mode and the second antenna working in both the first and second communication modes;
  when the first communication mode and the second communication mode are in connected state, the first antenna working in the first communication mode and the second antenna working in the second communication mode; and
  when the first communication mode is in idle state and the second communication mode is in connected state, the first antenna working in the first communication mode and the second antenna working in the second communication mode.

11. A mobile communication method based on a mobile communication terminal, wherein a communication unit of the mobile communication terminal is adapted to working in at least two communication modes, and an antenna assembly of the mobile communication terminal is adapted to selectively working in different communication modes or in a combination of different communication modes, the method comprising:
  selecting, based on a communication mode and a service type of the mobile communication terminal, a coupling relationship between the antenna assembly and the communication unit, so that the mobile communication terminal is able to work in various working modes; and
  when the communication mode and/or the service type of the mobile communication terminal changes, adjusting the coupling relationship between the antenna assembly and the communication unit based on the change, wherein adjusting the coupling relationship between the antenna assembly and the communication unit comprises adjusting a communication mode in which a part of antennas in the antenna assembly operates,
  wherein when the antenna assembly is composed of a first antenna and a second antenna, and the working mode of the mobile communication terminal is a dual-standby mode, the method further comprises determining the coupling relationship between the second antenna and the communication unit according to the current communication mode and service type of the mobile communication terminal, wherein adjusting the coupling relationship between the antenna assembly and the communication unit comprises:

when the first communication mode and the second communication mode is in idle states, and when the first communication mode enters into a connected state, switching the second antenna from the second communication mode to working in both the first and second communication modes;

when the first communication mode is in connected state and the second communication mode in idle state, and when a service is initiated in the second communication mode, switching the second antenna from working in both the first and second communication modes to the second communication mode;

when both the first communication mode and the second communication mode are in connected state, and when a service in the second communication mode is finished, switching the second antenna from the second communication mode to working in both the first and second communication modes;

when the service in the second communication mode is finished, and if the current first communication mode is in connected state, switching the second antenna from the second communication mode to working in both the first and second communication modes; and/or when the first communication mode is in connected state and the second communication mode in idle state, and when a service in the first communication mode is finished, switching the second antenna from working in both the first and second communication modes to the second communication mode.

12. The mobile communication method according to claim 11, wherein adjusting the coupling relationship between the second antenna and the communication unit further comprises:

adjusting a data transmission mode in the first communication mode between the communication unit and the network, so as to ensure that the mobile communication terminal can process a service which is received with a single antenna in the first communication mode.

* * * * *